(12) United States Patent
Fuechtner et al.

(10) Patent No.: US 8,499,868 B2
(45) Date of Patent: Aug. 6, 2013

(54) DRIVE SYSTEM AND MOTOR VEHICLE HAVING SUCH A DRIVE SYSTEM

(75) Inventors: Martin Fuechtner, Stuttgart (DE); Simon Singer, Utzmemmingen (DE)

(73) Assignee: Dr. Ing. H.C.F. Porsche Aktiengesellschaft (DE)

( * ) Notice: Subject to any disclaimer, the term of this patent is extended or adjusted under 35 U.S.C. 154(b) by 138 days.

(21) Appl. No.: 13/198,300

(22) Filed: Aug. 4, 2011

(65) Prior Publication Data

US 2012/0031691 A1 Feb. 9, 2012

(30) Foreign Application Priority Data

Aug. 6, 2010 (DE) .......................... 10 2010 036 884

(51) Int. Cl.
B60K 1/00 (2006.01)
(52) U.S. Cl.
USPC ........................................................ 180/65.7
(58) Field of Classification Search
USPC .................. 180/65.1, 65.6, 65.7, 242; 477/2, 477/3; 475/198, 207
See application file for complete search history.

(56) References Cited

U.S. PATENT DOCUMENTS

| | | | | |
|---|---|---|---|---|
| 3,770,074 | A * | 11/1973 | Sherman | 180/65.6 |
| 4,270,622 | A * | 6/1981 | Travis | 180/65.31 |
| 4,660,669 | A * | 4/1987 | Shimizu | 180/444 |
| 5,620,387 | A | 4/1997 | Janiszewski | |
| 5,845,732 | A * | 12/1998 | Taniguchi et al. | 180/65.6 |
| 6,892,837 | B2 * | 5/2005 | Simmons et al. | 180/6.44 |
| 7,410,017 | B2 * | 8/2008 | Gradu | 180/65.6 |
| 7,863,789 | B2 | 1/2011 | Zepp et al. | |
| 2003/0203782 | A1 * | 10/2003 | Casey et al. | 475/150 |
| 2009/0211824 | A1 | 8/2009 | Knoblauch et al. | |
| 2010/0323838 | A1 | 12/2010 | Rosemeier et al. | |

FOREIGN PATENT DOCUMENTS

| | | |
|---|---|---|
| DE | 44 31 929 | 10/1995 |
| DE | 19841159 | 1/2000 |
| JP | 2010-168035 | 8/2010 |
| WO | 2007110204 | 10/2007 |

* cited by examiner

*Primary Examiner* — Frank Vanaman
(74) *Attorney, Agent, or Firm* — Gerald E. Hespos; Michael J. Porco; Matthew T. Hespos

(57) ABSTRACT

A drive system (1) for a drive axle (2) of a motor vehicle has an electric machine (16) that at least partially encloses the drive axle (2) and that is capable of driving the drive axle (2). The electric machine (16) is coupled in a shiftable fashion to the drive axle (2) or is decoupled therefrom.

9 Claims, 9 Drawing Sheets

US 8,499,868 B2

DRIVE SYSTEM AND MOTOR VEHICLE HAVING SUCH A DRIVE SYSTEM

CROSS REFERENCE TO RELATED APPLICATION

This application claims priority under 35 USC 119 to German Patent Appl. No. 10 2010 036 884.9 filed on Aug. 6, 2010, the entire disclosure of which is incorporated herein by reference.

BACKGROUND OF THE INVENTION

1. Field of the Invention

The invention relates to a drive system for a motor vehicle and to a motor vehicle having such a drive system. The invention can be applied to any motor vehicle, but will be described with respect to a passenger motor vehicle.

2. Description of the Related Art

A hybrid vehicle generally has a hybrid drive system with plural drive units, such as an internal combustion engine and an electric machine. A parallel hybrid drive system generally is used in a hybrid vehicle to generate the highest possible energy efficiency level. The parallel hybrid drive system permits the electric machine and the internal combustion engine to apply torque to a transmission either alternately or cumulatively. Furthermore, the electric machine can be used as a generator, i.e. braking energy of the vehicle, which is present in the form of kinetic energy when the vehicle is braked, can be recovered and used, for example, to charge an electric energy store. Operation of the internal combustion engine under frequent load changes results in increased fuel consumption and emission of pollutants. Hence, frequent starting and acceleration processes, which usually occur in town traffic, preferably are carried out or supported by the electric machine of a hybrid vehicle. The electric machine and the connection of the electric machine to a drive system requires additional weight and installation space as compared to a motor vehicle without a hybrid drive system. Thus, it is desirable to make a hybrid drive system as compact and space-saving as possible.

DE 44 31 929 C1 describes a drive system for a drive axle of a hybrid vehicle that has an internal combustion engine and an electric machine. The drive system is arranged transversely with respect to the direction of travel of the motor vehicle and in the region of the drive axle of the motor vehicle. A crankshaft of the internal combustion engine optionally can be connected to the drive axle of the motor vehicle via a clutch and a transmission together with an intermediate shaft. A drive shaft of the electric machine is connected continuously to the drive axle of the motor vehicle via a gear mechanism and a generator is arranged on the crankshaft of the internal combustion engine, structurally separated from the electric machine. However, this arrangement is disadvantageous because the parallel arrangement of the shaft of the electric machine, the shaft of the generator and the drive shaft requires a relatively large installation space for the drive system. Furthermore, a drag torque disadvantageously is generated when the electric machine is not in the electric motor operating mode due to the continuous connection of the electric machine to the drive axle.

The invention is therefore based on the object of providing an improved drive system that eliminates the above-mentioned disadvantages.

SUMMARY OF THE INVENTION

The invention relates to a drive system for a drive axle of a motor vehicle with an electric machine that at least partially encloses the drive axle and has the purpose of driving the drive axle. The electric machine is coupled in a shiftable fashion to the drive axle or is decoupled therefrom. The invention also relates to a motor vehicle having such a drive system.

The electric machine that at least partially encloses the drive axle provides a very compact drive system that advantageously can be used in a small installation space. The shiftable coupling of the electric machine to the drive axle avoids continuous concurrent running of the electric machine with the drive axle and reliably prevents the generation of a disadvantageous drag torque.

The drive axle may have two drive axle sections that are connected operatively to one another by a planetary or ball-type differential transmission. Thus, a relative difference in rotational speeds of the axle sections advantageously is possible.

The drive system preferably has a cooling device for cooling the electric machine. The cooling device may be a liquid cooling device and/or an air cooling device. As a result, the power that can be extracted from the electric machine advantageously can be increased, thereby improving the efficiency level of the electric machine.

The drive system preferably has a shifting device for coupling the electric machine to the drive axle or for decoupling the electric machine from the drive axle. The shifting device may be coaxial with the drive axle and may at least partially enclose the drive axle. Thus, a small axial installation space is required for the drive system and the field of application is extended.

The drive system preferably has a first gear stage for implementing a first transmission ratio between the electric machine and the drive axle and may further have a second gear stage for implementing a second transmission ratio between the electric machine and the drive axle. Thus, the electric machine can operate over a wide rotational speed range. At least one of the gear stages preferably is coaxial with the drive axle and at least partially encloses the drive axle. Thus, the axial installation space of the drive system is reduced, thereby extending the possible field of application of the drive system.

At least one gear stage preferably is a planetary gear stage. As a result of this, the gear stages are very compact both axially and radially, thereby reducing the installation space necessary for the drive system.

The drive system preferably has a bevel transmission with a crown gear of the bevel transmission mounted on a planetary carrier of the second gear stage. Thus, the crown gear and the planetary carrier advantageously can be supported with the same bearing arrangement, thereby reducing the number of components of the drive system.

The drive system may have a modular design so that the drive system can be adapted quickly and conveniently to different technical peripheral conditions. Thus, the range of possible applications of the drive system is large.

The shifting device preferably has a shifting sleeve that can be displaced axially on the drive axle and has a first shifting sleeve outer toothing. The first shifting sleeve outer toothing is in operative engagement with a sun gear inner toothing of a sun gear of the second gear stage. This advantageously permits simple shifting of the drive system.

The shifting sleeve preferably has a second shifting sleeve outer toothing that is spaced axially from the first shifting sleeve outer toothing. The second shifting sleeve outer toothing is disengaged from a planetary carrier inner toothing of a planetary carrier of the first gear stage and from a sun gear inner toothing of a sun gear of the first gear stage in a first operating state of the drive system. As a result, the electric machine freewheels and is decoupled from the drive axle. Thus, the electric machine advantageously generates no braking drag torque in a switched-off state.

The second shifting sleeve outer toothing may operatively engage the planetary carrier inner toothing of the planetary carrier of the first gear stage in a second operating state of the drive system. Thus, the second shifting sleeve can transmit a driving torque of the electric machine to the drive axle by means of the first gear stage, the shifting sleeve, the second gear stage and the planetary differential transmission. This advantageously implements a first transmission ratio between the electric machine and the drive axle.

The second shifting sleeve outer toothing may operatively engage the sun gear inner toothing of the sun gear of the first gear stage in a third operating state of the drive system. Thus, the second shifting sleeve may transmit a driving torque of the electric machine to the drive axle by means of the shifting sleeve, the second gear stage and the planetary differential transmission. This advantageously implements a second transmission ratio between the electric machine and the drive axle.

The electric machine preferably is designed both for an electric motor operating mode and for the generator operating mode. Thus, the electric machine advantageously can be used both to drive the drive system and to recover braking energy.

DETAILED DESCRIPTION OF THE PREFERRED EMBODIMENTS

Figure 1:
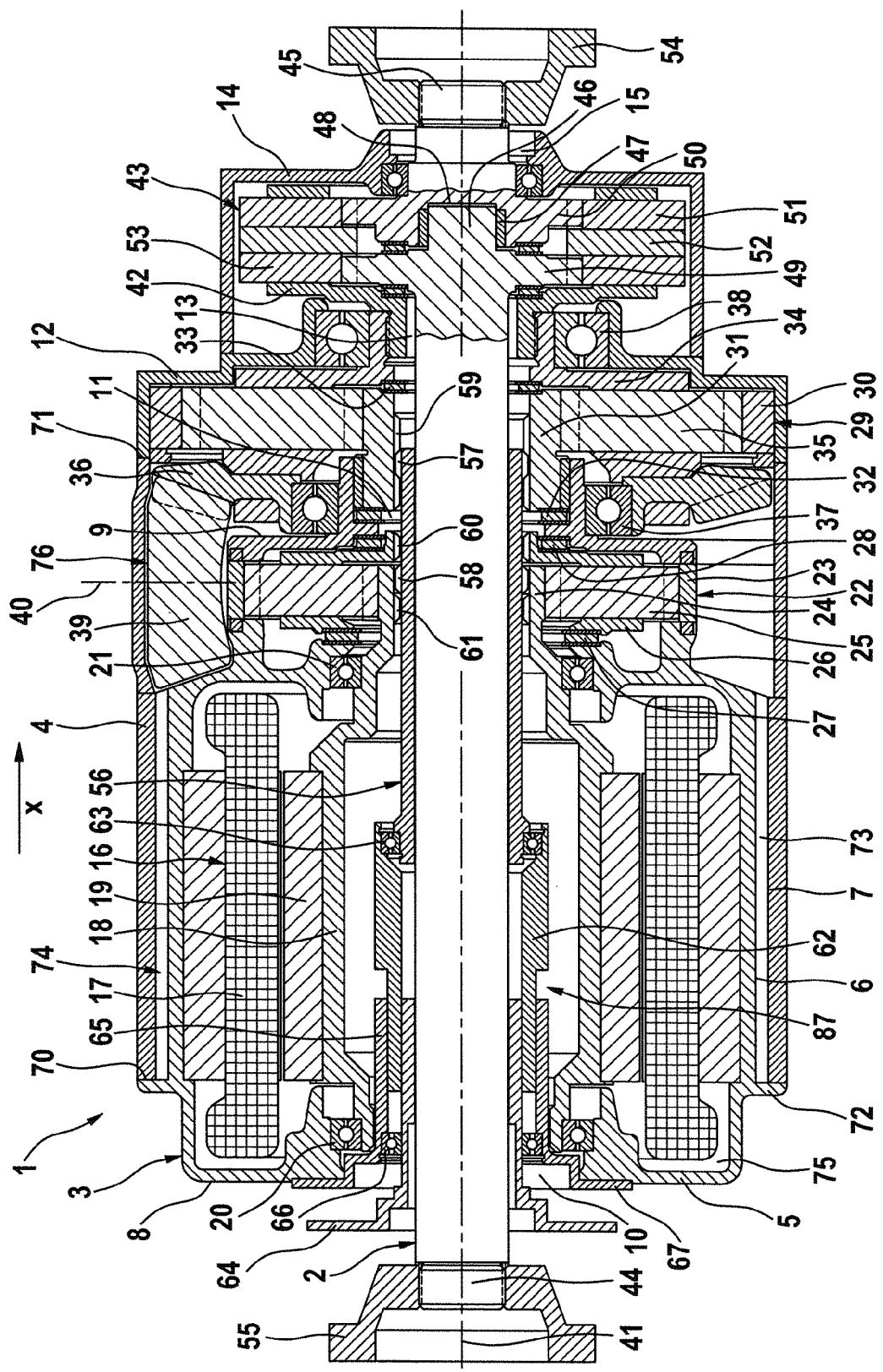
FIG. 1 is a plan view of a drive system according to a first embodiment of the invention.

FIG. 1 illustrates a first embodiment of a drive system 1 for a drive axle 2 of a motor vehicle. The drive axle 2 is a front axle 2 of a motor vehicle. The drive system 1 has a multi-component housing 3 connected in a rotationally fixed fashion to a load-bearing vehicle structure of the motor vehicle. The housing 3 has a hollow substantially cylindrical first housing component 4 with two annular end faces 70, 71. The first housing component 4 can be made of multiple parts. A second housing component 5 is held at least partly in the first housing component 4 and defines a barrel shape with a circumferential flange section 72 that bears against and seals to the end face 70 of the first housing component 4. The second housing component 5 is configured and held in the first housing component 4 is disposed around the drive axle 2. A tubular cavity 73 is formed between a cylindrical outer face 6 of the second housing component 5 and a cylindrical inner face 7 of the first housing component 4 and holds a cooling fluid, such as water. Thus, the cavity 73 forms a cooling fluid jacket 73 that can be a component of a cooling device 74 of the drive system 1. The cooling device 74 may be a liquid cooling device 74, an air cooling device 74 or a combined liquid/air cooling device 74. The cooling fluid can flow through the cavity 73 so that the cavity functions as a fluid duct. The second housing component 5 can have multiple parts and end faces 8, 9 of the second housing component 5 have breakthroughs 10, 11 for accommodating the drive axle 2. The first and second housing components 4 and 5 may be screwed or welded to one another. The housing 3 also has a third housing component 12 mounted on the end face 71 of the first housing component 4. The third housing component 12 is essentially in the shape of a pot and the floor of the pot shape has a breakthrough 13 for accommodating the drive axle 2. The floor of the pot shape of the third housing component points away from the end face 71 of the first housing component 4. The third housing component 12 may be screwed to the first housing component 4. A fourth housing component 14 of the housing 3 also is in the shape of a pot, with a breakthrough 15 in the floor of the pot shape for accommodating the drive axle 2. An edge of the pot shape of the fourth housing component 14 rests on the floor of the third housing component 12. The fourth housing component 14 may be screwed or welded to the third housing component 12. An outer diameter of the housing 3 is, for example, 200 to 210 millimeters.

An electric machine 16 is accommodated in the second housing component 5 and is designed both for a generator operating mode and an electric motor operating mode. The electric machine 16 has a stator 17 secured in the second housing component 5. The stator 17 is essentially in the shape of a hollow cylinder and encloses the drive axle 2 around its circumference. A hollow rotor shaft 18 of a rotor 19 of the electric machine 16 is supported rotatably on two bearings 20, 21 in the second housing component 5. The bearings 20, 21 may be roller bearings. The drive axle 2 is led through the rotor shaft 18 of the rotor 19. The electric machine 16 therefore encloses the drive axle 2 around its circumference. The second housing component 5 forms a cooling duct 75 that surrounds the stator 17 at least in certain sections. Air can flow through the cooling duct 75 to the stator 17 for cooling the electric machine 16, and heated waste air is carried away by the cooling duct 75 to permit forced cooling of the electric machine 16. The cooling duct 75 is a component of the cooling device 74 that includes the fluid duct 73 and that functions to cool the rotor 19 of the electric machine 16.

The drive machine 1 also has a first gear stage 22 embodied, for example, as a first planetary gear stage. The first gear stage 22 is arranged next to the electric machine 16 with respect to a longitudinal direction x of the drive machine 2. A first ring gear 23 of the first gear stage 22 is secured in a rotationally fixed fashion in the second housing component 5, and the drive axle 2 runs through the ring gear 23. The ring gear 23 has an annular shape with an inner toothing that points to the drive axle 2. A first sun gear 24 of the first gear stage 22 is connected to the rotor shaft 18 of the electric machine 16 and is an integral component of the rotor shaft 18. The sun gear 24 has an outer toothing that points to the inner toothing of the ring gear 23. Planetary gears of the first gear stage 22 operatively engage the inner toothing of the ring gear 23 and the outer toothing of the sun gear 24, reference being made below only to a planetary gear 25. For example, the first gear stage 22 has three planetary gears. The planetary gear 25 or a rotational axis of the planetary gear 25 is held by a first planetary carrier 26 of the first gear stage 22 so that the planetary gear 25 is supported rotatably on the planetary carrier 26. The planetary carrier 26 is mounted, for example, on bearings 27, 28 in the second housing component 5 so as to be rotatable in relation to the housing 3. The bearings 27, 28, for example, are sliding bearings 27, 28. The planetary carrier 26 engages around the circumference of the drive axle 2. The first gear stage 22 is designed to implement a first transmission ratio between the electric machine 16 and the drive axle 2.

The drive system 1 also has a second gear stage 29 embodied, for example, as a planetary transmission. The second gear stage 29 at least partially encloses the drive axle 2. A second crown gear 30 of the second gear stage 29 is secured in a rotationally fixed fashion in the third housing component 12. The crown gear 30 has an essentially annular shape with an inner toothing that points to the drive axle 2. A hollow cylindrical second sun gear 31 of the second gear stage 29 engages around the drive axle 2. The sun gear 31 has an outer toothing facing the crown gear 30 and a sun gear inner toothing 59 facing the drive axle 2. The sun gear 31 is supported on the second housing component 5 by a bearing 32 and on a second planetary carrier 34 of the second gear stage 29 by a bearing point 33 so as to be rotatable about the drive axle 2. The bearings 32, 33 are embodied, for example, as sliding bearings 32, 33. The planetary carrier 34 bears planetary gears of the second gear stage 29, with reference being made below to just one planetary gear 35. The planetary gear 35 operatively engages the crown gear 30 and the sun gear 31. The planetary gear 35 is mounted rotatably on the planetary carrier 34. The planetary carrier 34 is supported rotatably in the housing 3 by bearings 37, 38, such as roller bearings. The second gear stage 29 is designed to implement a second transmission ratio between the electric machine 16 and the drive axle 2.

The drive system has a bevel transmission 76 with a crown gear 36 and a bevel gear 39 in operative engagement therewith. The crown gear 36 is mounted on the planetary carrier 34 of the second gear stage 29 and coaxially engages around the drive axle 2. The crown gear 36 is supported rotatably in the housing 3 by the bearings 37, 38, with the crown gear 36 preferably accommodating the bearing 37. The bearings 37, 38 therefore support both the planetary carrier 34 and the crown gear 36. The crown gear 36 is between the first gear stage 22 and the second gear stage 29. The bevel gear 39 engages the crown gear 36, with a central axis 40 of the bevel gear 39 being perpendicular to a central axis 41 of the drive axle 2. Alternatively, an angle is formed as desired between the central axis 40 of the bevel gear 39 and the central axis 41 of the drive axle 2.

The drive axle 2 has first and second coaxial drive axle sections 44 and 45, with the first drive axle section 44 supported rotatably in the second drive axle section 45. The first drive axle section 44 has a tappet 46 rotatably supported by a bearing 47 in a recess 48 of the second drive axle section 45 to support the first drive axle section 44 in the second drive axle section 45. The first and second drive axle sections 44 and 45 have circumferential flanges 49, 50 respectively embodied as sun gears 49, 50 of a planetary differential transmission 43. The differential transmission 43 alternatively can be a ball-type differential transmission 43. The drive axle section 44 has an output flange 54 at its end opposite the tappet 46 and the second drive axle section 45 has an output flange 55 at its end facing away from the recess 48. The output flanges 54, 55 serve, for example, to drive wheels of a motor vehicle.

The planetary carrier 34 of the second gear stage 29 is connected permanently to a planetary differential transmission carrier 42 of a planetary differential transmission 43 of the drive system 1. The planetary differential transmission 43 is arranged in a longitudinal direction x of the drive axle 2, for example downstream of the second gear stage 29 so that the drive axle 2 passes through the planetary differential transmission 43. The planetary differential transmission 43 has planetary gears planets 51, 52, 53. The planetary differential transmission 43 is embodied to compensate for differences in rotational speed between the drive axle sections 44, 45.

The drive system 1 also has a hollow cylindrical toothed shifting sleeve 56 in which the drive axle 2 preferably runs in a contactless fashion. A first shifting sleeve outer toothing 57 is arranged around the circumference of the shifting sleeve 56 in the region of an end section of the shifting sleeve 56 that points in the direction of the planetary differential transmission 43. The shifting sleeve 56 also has a second circumferential shifting sleeve outer toothing 58 spaced axially from the first shifting sleeve outer toothing 57. The first shifting sleeve outer toothing 57 operatively engages the sun gear inner toothing 59 of the sun gear 31 of the second gear stage 29 and is axially displaceable along the sun gear inner toothing 59 in the longitudinal direction x and counter to the longitudinal direction x. The toothings 57, 59 always are in operative engagement. The second shifting sleeve outer toothing 58 optionally is located in a shiftable fashion either in operative engagement with a planetary carrier inner toothing 60 on the planetary carrier 26 of the first gear stage 22 or with a sun gear inner toothing 61 on an inner face of the sun gear 24 of the first gear stage 22. The inner toothing 59 of the sun gear 31 of the second gear stage 29 is configured in the longitudinal direction x of the drive axle 2 so that when the shifting sleeve 56 is displaced axially along the drive axle 2, the first outer toothing 57 of the toothed shifting sleeve 56 always is in engagement with the inner toothing 59 of the sun gear 31 of the second gear stage 29.

A hollow activation shaft 62 surrounds the drive axle 2 and functions to activate the toothed shifting sleeve 56. The activation shaft 62 is supported on the shifting sleeve 56 by a bearing 63 and surrounds the shifting sleeve in certain sections. The bearing 63 may be a roller bearing. The shifting sleeve 56 can rotate relative to the activation shaft 62.

The drive axle 2 runs in a contactless fashion through an activation sleeve 64 that is connected operatively to the activation shaft 62 to activate it. The activation sleeve 64 is preferably stationary in relation to the housing 3, like the activation shaft 62. The activation sleeve 64 has a hollow cylindrical basic shape with a circumferential flange outside the housing 3. The activation sleeve 64 is surrounded circumferentially by a terminating sleeve 65 and is supported therein by a bearing 66. The terminating sleeve 65 has a circumferential flange 67 that the closes off the end face 8 of the housing 3. The activation sleeve 64 and the shifting sleeve 56 form a shifting device 87 of the drive system. The shifting device 87 preferably has the gear stages 22, 29.

Figure 2:
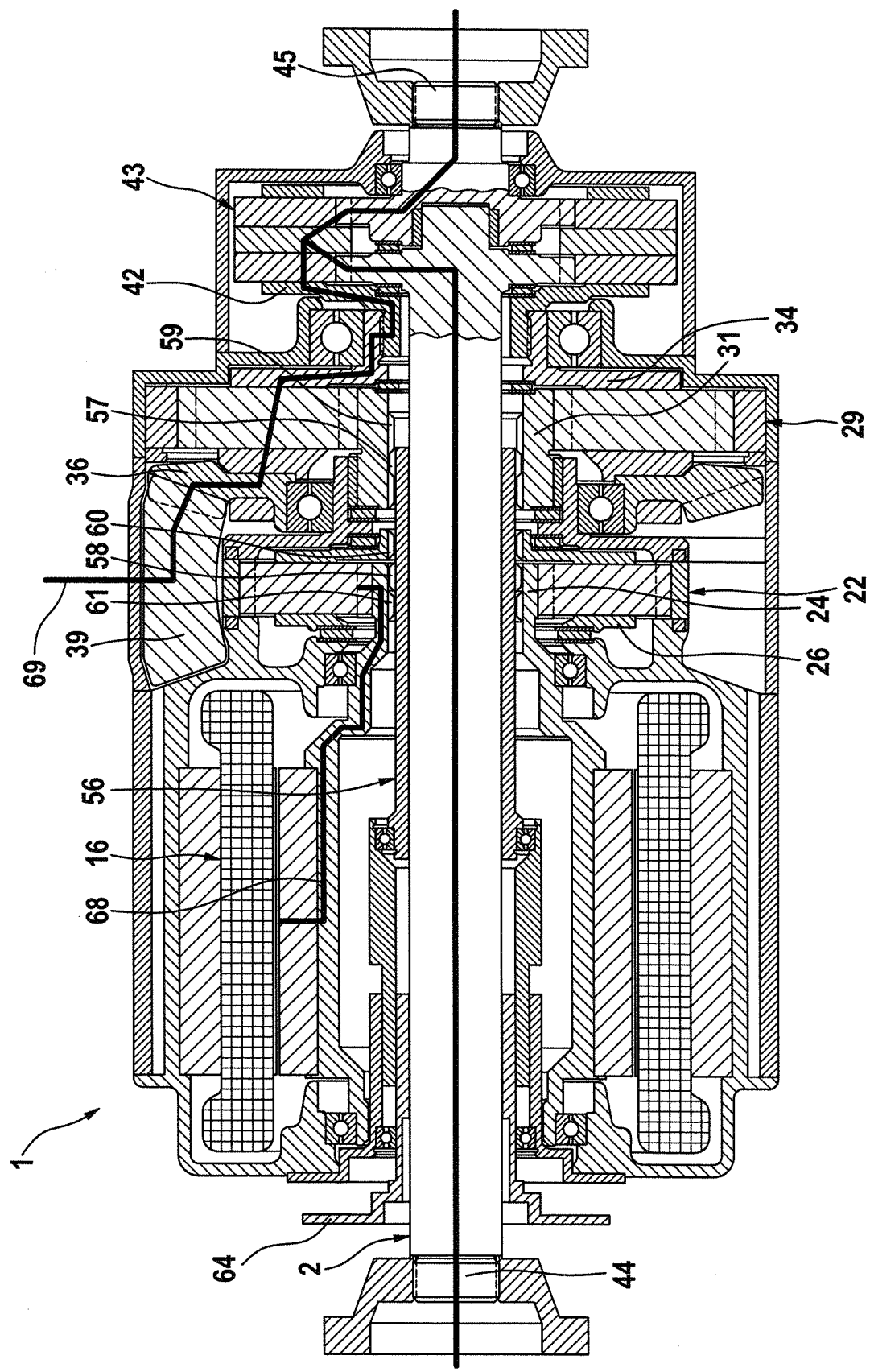
FIG. 2 shows the drive system of FIG. 1 in a first operating state.

The functioning of the drive system 1 of FIG. 1 is explained below. FIG. 2 illustrates the drive system 1 in a first operating state and the shifting sleeve 56 is in a first shifting state. The first shifting state corresponds to an initial or zero position where the shifting sleeve 56 is in a decoupled state. The second shifting sleeve outer toothing 58 does not operatively engage either the inner toothing 61 of the first sun gear 24 of the first gear stage 22 or the inner toothing 60 of the first planetary carrier 26 of the first gear stage 22. The first circumferential outer toothing 57 of the shifting sleeve 56 operatively engages the inner toothing 59 of the second sun gear 31 of the second gear stage 29. A torque represented by the line 68 is applied by the electric machine 16 to the first sun gear 24 of the first gear stage 22, but is not transmitted to the drive shaft 2 in this shift position of the shifting sleeve 56. The drive system 1 is in a neutral position in which the electric machine 16 is decoupled from the gear stages 22, 29 and from the drive axle 2. In this shift state of the shifting sleeve 56, the electric machine 16 is switched off. A torque represented by the line 69 is transmitted by the bevel gear 39 to the crown gear 36 and from the crown gear 36 to the second planetary carrier 34 of the second gear stage 29 to which the crown gear 36 is permanently coupled. For example, an internal combustion engine or a further electric machine applies the torque 69 to the bevel gear 39. The second planetary carrier 34 transmits the torque 69 to the planetary differential transmission 43, which is coupled permanently to the planetary differential planetary carrier 42. The torque then is transmitted from the planetary differential transmission 43 to the drive axle sections 44, 45 of the drive axle 2.

Figure 3:
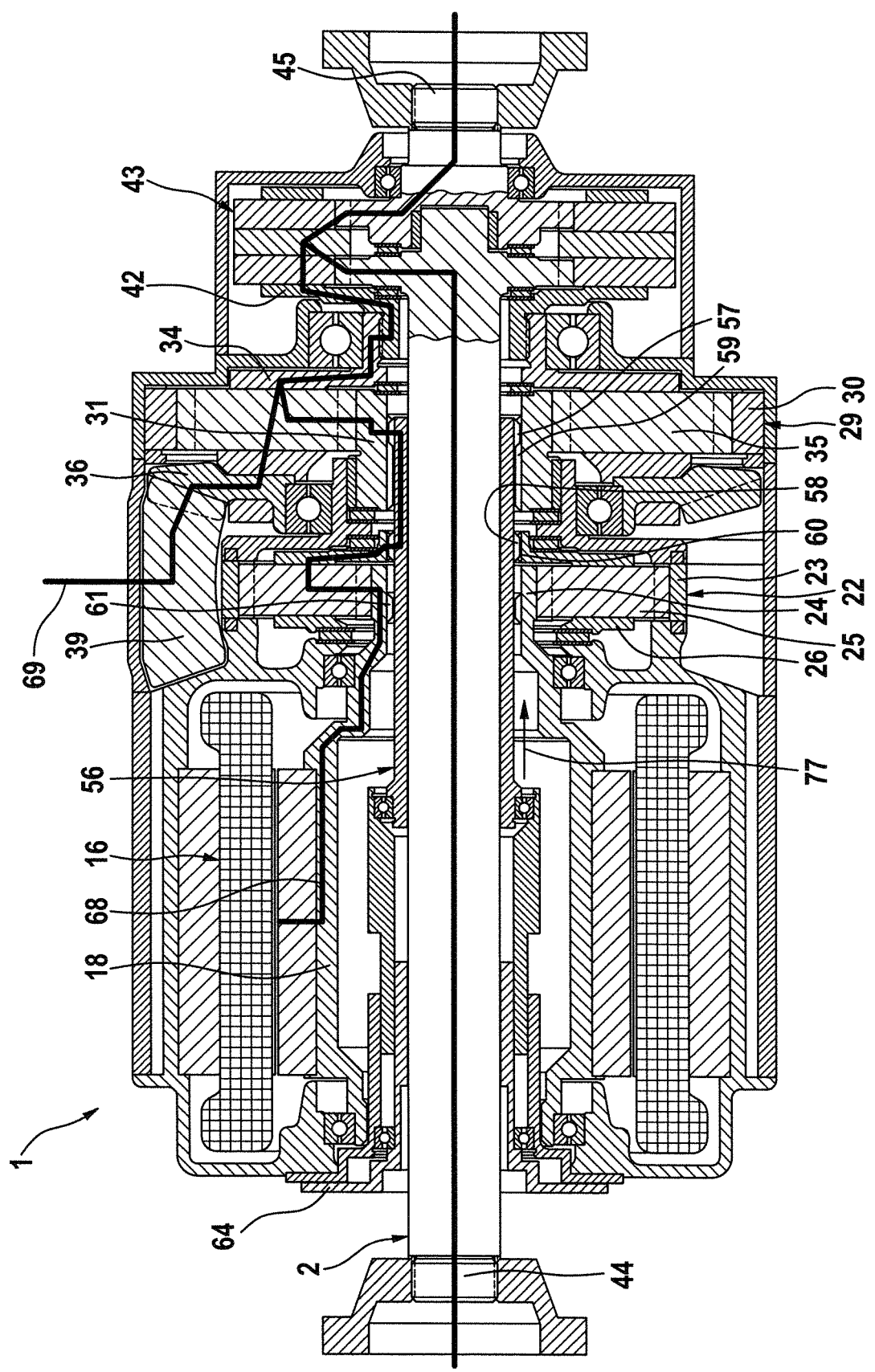
FIG. 3 shows the drive system of FIG. 1 in a second operating state.

FIG. 3 illustrates the drive system 1 in a second operating state where the activation sleeve 64 displaces the shifting sleeve 56 rightward from its zero position, as is indicated by the arrow 77. The second circumferential outer toothing 58 of the shifting sleeve 56 continues to be disengaged from the inner toothing 61 of the first sun gear 24 of the first gear stage 22, but operatively engages the inner toothing 60 of the first planetary carrier 26 of the first gear stage 22. The first outer toothing 57 of the shifting sleeve 56 also is engaged operatively with the inner toothing 59 of the second sun gear 31 of the second gear stage 29. In this operating state, a torque 68 of the electric machine 16 is transmitted from the rotor shaft 18 thereof to the sun gear 24 of the first gear stage 22. The first sun gear 24 is engaged operatively with the planetary gear 25, which in turn is engaged operatively with the ring gear 23 of the first gear stage 22. The planetary gear 25 is set in motion by a rotational movement of the first sun gear 24 in relation to the fixed first ring gear 23. The planetary gear 25 runs around the drive axle 2 in the first ring gear 23 and rotates the first planetary carrier 26. The torque therefore is transmitted from the first sun gear 24 to the first planetary carrier 26 with a certain transmission ratio. The second outer toothing 58 of the shifting sleeve 56 is engaged operatively with the inner toothing 60 of the first planetary carrier 26. Thus, the torque 68 is transmitted from the first planetary carrier 26 to the shifting sleeve 56. The first outer toothing 57 of the shifting sleeve 56 is engaged operatively with the inner toothing 59 of the sun gear 31 of the second gear stage 29 and transmits the torque to the second sun gear 31. The second sun gear 31 moves in relation to the stationary second crown gear 30 and sets the second planetary gear 35 in motion. The second planetary gear 35 runs around the drive shaft 2 in the second crown gear 30. As a result, the second planetary carrier 34 is made to rotate. The torque 68 therefore is transmitted from the second sun gear 31 to the second planetary carrier 34 with a certain transmission ratio. The second planetary carrier 34 is connected permanently to the planetary differential carrier 42 of the planetary differential transmission 43 and transmits the torque 68 from the second planetary carrier 34 to the planetary differential transmission 43 to drive the drive axle sections 44, 45 of the drive axle 2.

Torque 69 transmitted from the bevel gear 39 to the crown gear 36 is transmitted, in an analogous fashion to the first operating state of the drive system 1 according to FIG. 2, from the crown gear 36 to the second planetary carrier 34, which is connected operatively thereto, and then is transmitted to the planetary differential transmission 43 by the planetary differential transmission planetary carrier 42 to drive the drive axle sections 44, 45. The two torques 68, 69 are accumulated in the second gear stage.

Figure 4:
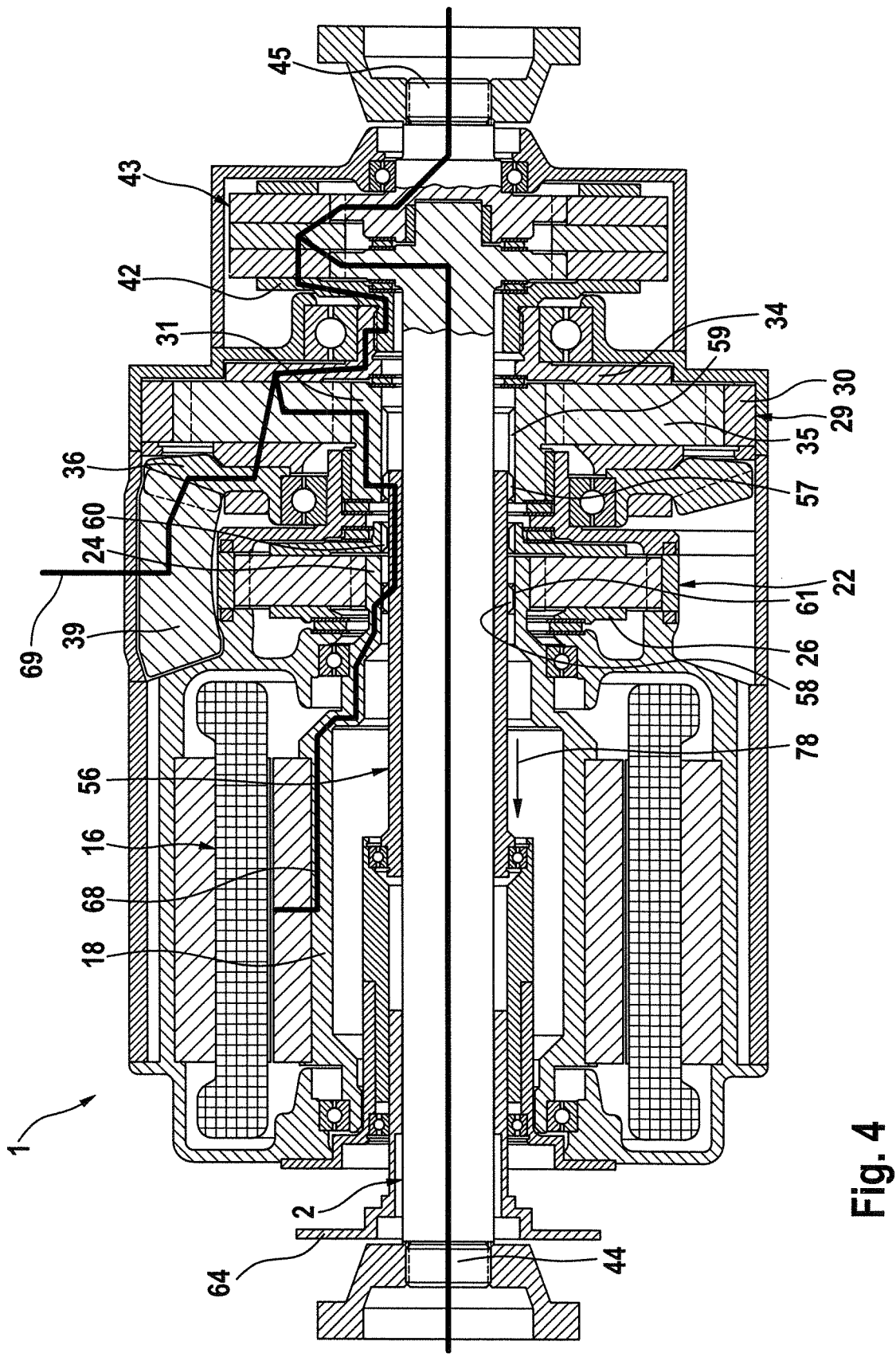
FIG. 4 shows the drive system of FIG. 1 in a third operating state.

FIG. 4 illustrates the drive system 1 in a third operating state. In this operating state of the drive system 1, the activation sleeve 64 displaces the shifting sleeve 56 leftward with respect to its position of FIG. 2, as is indicated by the arrow 78. More particularly, the second outer toothing 58 of the shifting sleeve 56 is engaged operatively with the inner toothing 61 of the first sun gear 24 of the first gear stage 22 and is disengaged from the inner toothing 60 of the first planetary carrier 26. The first outer toothing 57 of the shifting sleeve 56 continues to be engaged operatively with the inner toothing 59 of the second sun gear 31 of the second gear stage 29. A torque 68 applied by the electric machine 16 to its rotor shaft 18 is transmitted from the rotor shaft 18 to the first sun gear 24. The inner toothing 61 of the sun gear 24 is engaged operatively with the second outer toothing 58 of the shifting sleeve 56 and transmits the torque 68 to the shifting sleeve 56. The torque 68 therefore is conducted past the first gear stage 22. The first circumferential outer toothing 57 of the shifting sleeve 56 is engaged with the inner toothing 59 of the second sun gear 31 of the second gear stage 29 and rotates the second sun gear 31. As a result, the planetary gear 35 is set in motion with respect to the fixed second crown gear 30. Torque 68 is transmitted from the planetary gear 35 to the second planetary carrier 34 and from there to the planetary differential transmission carrier 42. The torque 68 is transmitted correspondingly by the planetary differential transmission 43 to the drive axle sections 44, 45 of the drive axle 2.

In a way which is analogous to the operating states of the drive system 1 according to FIGS. 2 and 3, a torque 69 transmitted from the bevel gear 39 to the crown gear, which is connected permanently to the second planetary carrier 34, initially is transmitted from the crown gear 36 to the second planetary carrier 34 and from there to the planetary differential transmission carrier 42. The planetary differential transmission 43 transmits the torque 69 to the drive axle sections 44, 45 of the drive axle 2.

Figure 5:
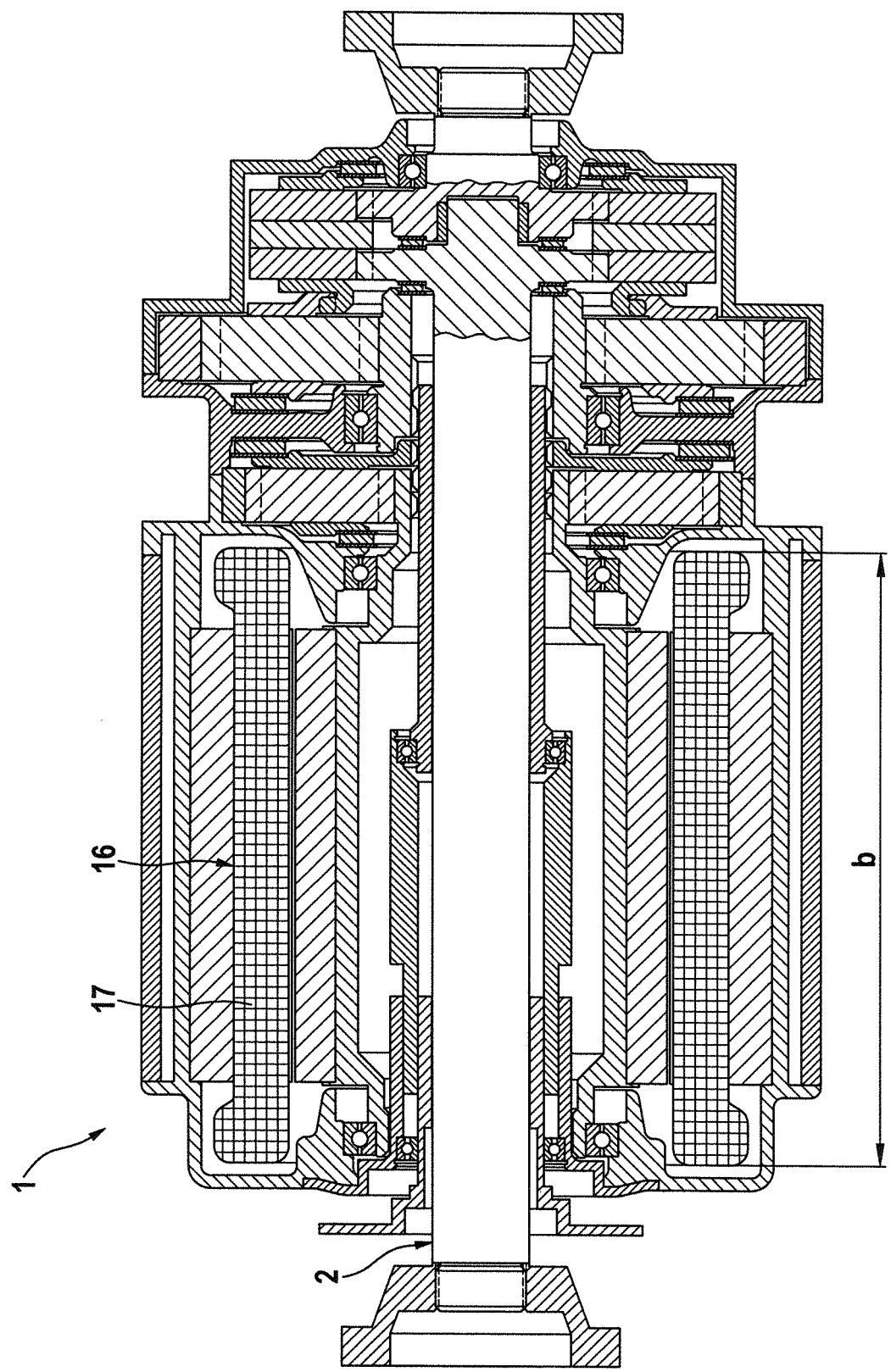
FIG. 5 is a plan view of a drive system according to a second embodiment of the invention.

FIG. 5 illustrates a second embodiment of a drive system 1. The drive system 1 of FIG. 5 differs from the drive system 1 of FIG. 1 essentially in that the crown gear 36 and the bevel gear 39 of FIG. 1 are not present in FIG. 2. Thus, the size of an axial installation space b of the electric machine 16 can be increased. For example, a length of 100, 120 or 140 mm can be provided as an effective length b of the stator 17. The drive systems 1 of FIGS. 1 and 5 are designed according to an identical component concept. That is to say, for the embodiment of FIG. 1 with the crown gear 36 and the bevel gear 39 and for the embodiment of FIG. 5 without the components 36, 39, the largest possible number of structurally identical components are installed, such as the gear stages 22, 29, the drive axle 2, the shifting device 87 or the differential transmission 43. The gear stages 22, 29, the drive axle 2, the shifting device 87 and the differential transmission 43 are easily replaceable prefabricated, modules 22, 29, 2, 87, 43 of the drive system 1. Depending on technical requirements, the drive system 1 can be implemented in a modular fashion according to a modular principle. For example, an electric machine 6 that is short or long with respect to the effective length b is used depending on the requirement for a mechanical all wheel drive, that is to say the requirement for the presence of the crown gear 36 and of the bevel gear 39. The size of the electric machine 16 is also dependent, for example, on the necessary electrical power.

Figure 6:
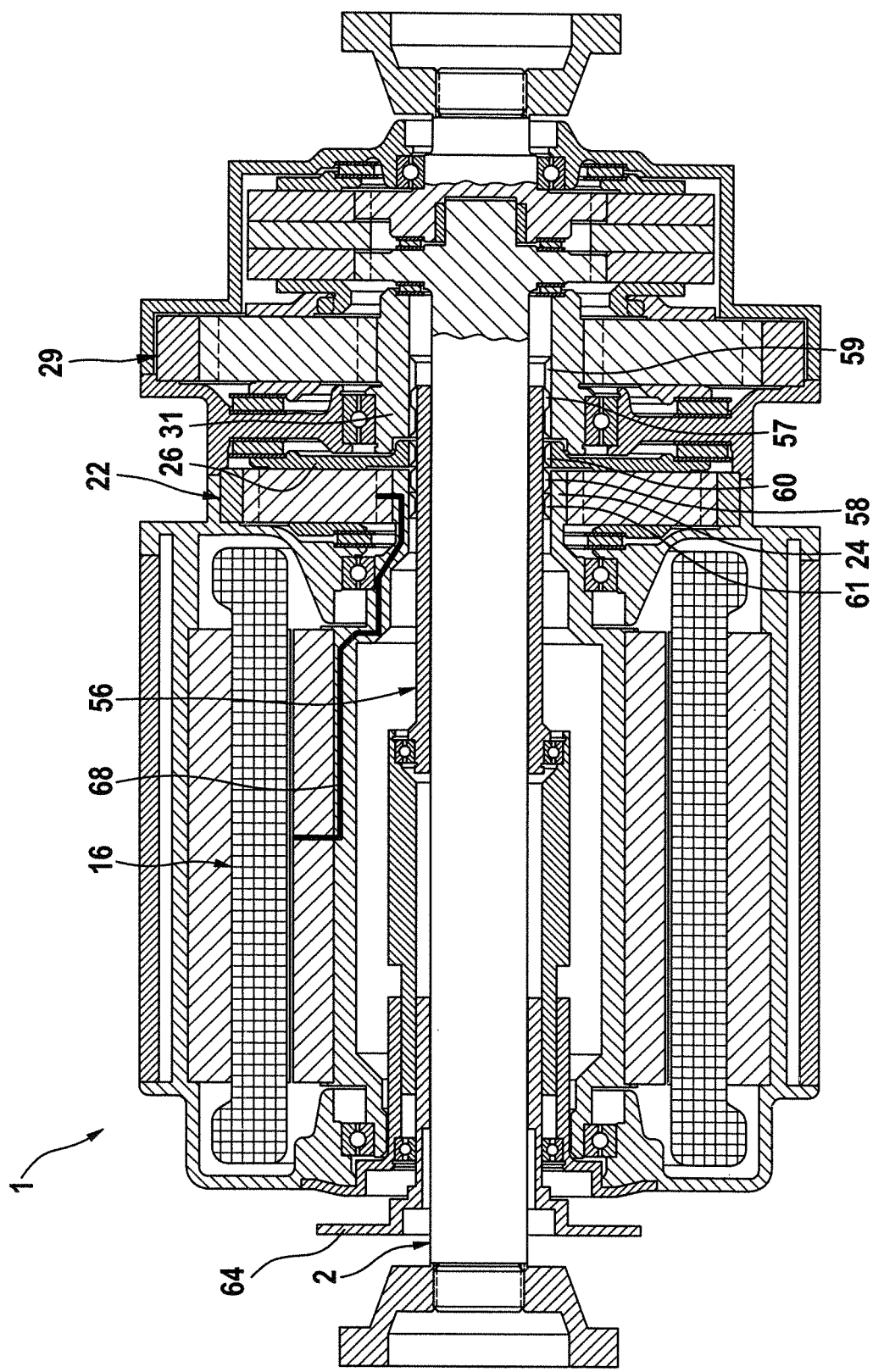
FIG. 6 shows the drive system of FIG. 5 in a first operating state.

FIG. 6 illustrates a first operating state of the embodiment of the drive system 1 of FIG. 5. The shifting sleeve 56 is initially in a decoupled state and at its initial or zero position. More particularly, the first outer toothing 57 of the shifting sleeve 56 is engaged operative with the inner toothing 59 of the sun gear 31 of the second gear stage 29. The second outer toothing 58 of the shifting sleeve 56 is not operatively engaged with either the inner toothing 60 of the planetary carrier 26 of the first gear stage 22 or the inner toothing 61 of the sun gear 24 of the first gear stage 22. The electric machine 16 cannot apply a torque 68 to the drive shaft 2 and in this operating state of the drive system 1, the electric machine 16 is switched off.

Figure 7:
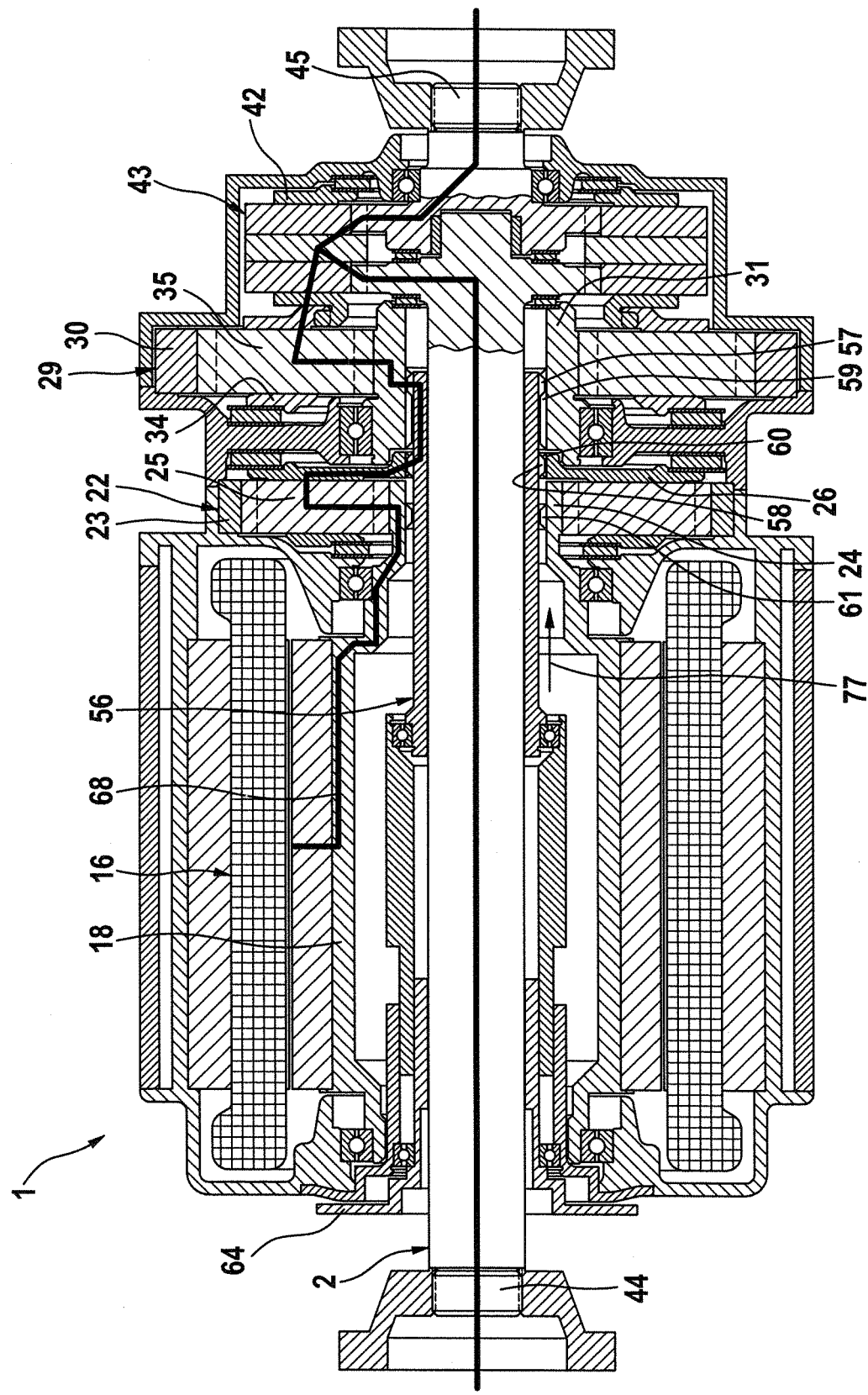
FIG. 7 shows the drive system of FIG. 5 in a second operating state.

FIG. 7 illustrates the drive system 1 of FIG. 5 in a second operating state. The activation sleeve 64 is activated to displace the shifting sleeve 56 rightward from its initial position, as represented by the arrow 77. The first outer toothing 57 of the shifting sleeve 56 also is engaged operatively with the inner toothing 59 of the sun gear 31 of the second gear stage 29 and the second outer toothing 58 of the shifting sleeve 56 is engaged with the inner toothing 60 of the first planetary carrier 26. A torque 58 applied by the electric machine 16 to the rotor shaft 18 is transmitted to the sun gear 24 of the first gear stage 22 and from there to the first planetary carrier 26 by the planetary gear 25 and the fixed first ring gear 23. The first planetary carrier 26 is engaged operatively with the shifting sleeve 56, the torque 68 and transmits the torque via the shifting sleeve 56 to the sun gear 31 of the second gear stage 29. The torque 68 is transmitted with a predetermined transmission ratio by means of the planetary gear 35 of the second gear stage 29 and the fixed crown gear 30 of the second gear stage 29 to the second planetary carrier 34 which is permanently connected to the planetary differential transmission carrier 42. The planetary differential transmission 43 transmits the torque 68 to the drive axle sections 44, 45 of the drive axle 2.

Figure 8:
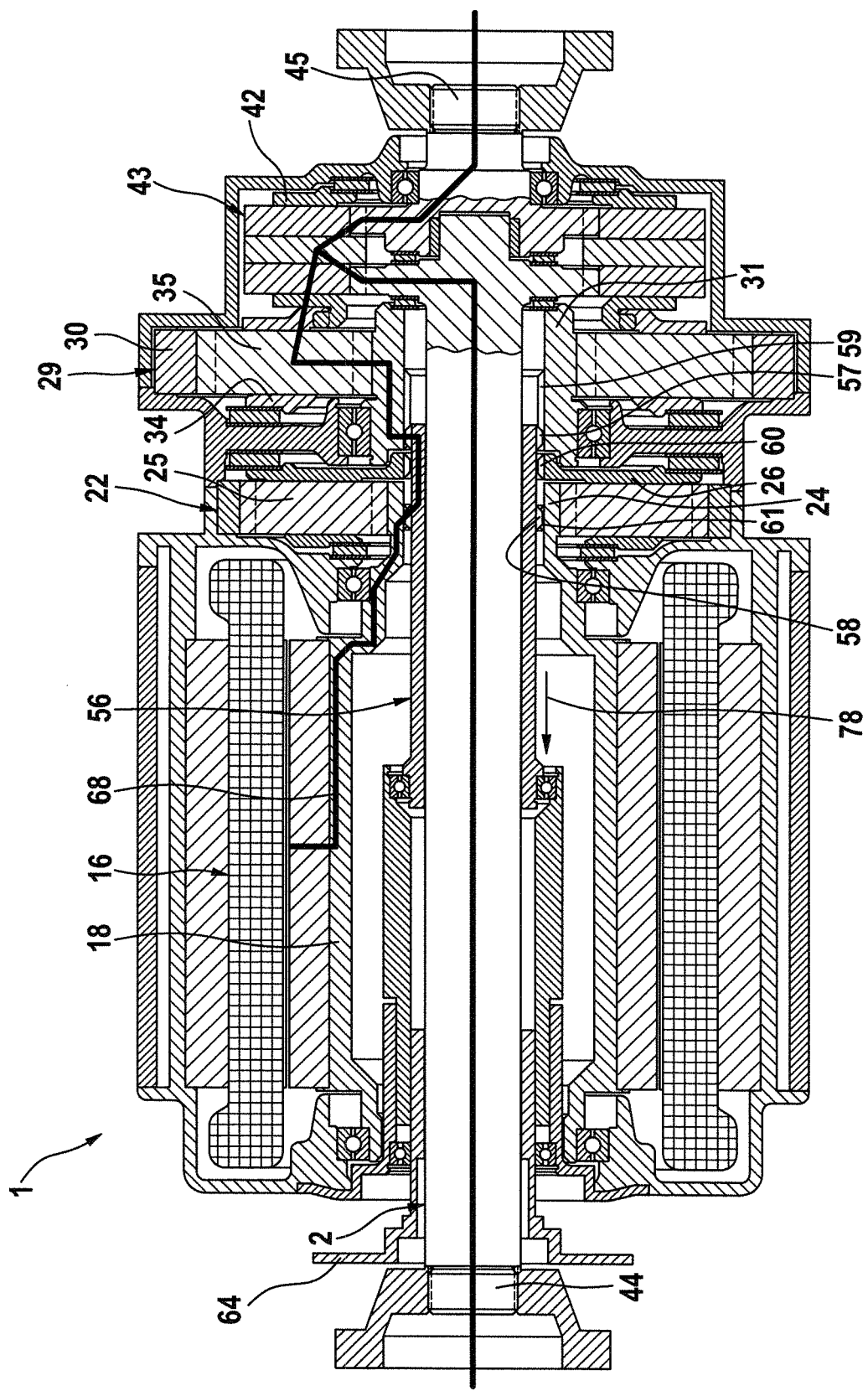
FIG. 8 shows the drive system of FIG. 5 in a third operating state.

FIG. 8 illustrates the drive system 1 of FIG. 5 in a third operating state. The activation sleeve 64 is activated to displace the shifting sleeve 56 leftward from its initial position, as represented by the arrow 78. The first outer toothing 57 of the shifting sleeve 56 therefore is engaged operatively with the inner toothing 59 of the second sun gear 31 of the second gear stage 29. The second outer toothing 58 of the shifting sleeve 56 is disengaged from the inner toothing 60 of the first planetary carrier 26 of the first gear stage 22, but is engaged operatively with the inner toothing 61 of the first sun gear 24. A torque 68 generated by the electric machine 16 is transmitted to the first sun gear 24 via the hollow shaft 18. The inner toothing 61 of the first sun gear 24 is engaged operatively with the second outer toothing 58 of the shifting sleeve 56. Thus, the torque 68 is transmitted past the first gear stage 22 from the first sun gear 24 to the shifting sleeve 56 and from there via the first outer toothing 57 and the inner toothing 59 of the second sun gear 31 of the second gear stage 29 to the second sun gear 31. The torque 68 then is transmitted with a predetermined transmission ratio to the second planetary carrier 34 by the planetary gear 35 of the second gear stage 29 and the fixed second crown gear 30. The torque is transmitted to the planetary differential transmission 43 from the second planetary carrier 34, which is operatively connected to the planetary differential transmission carrier 42. The planetary differential transmission 43 transmits the torque 68 to the drive axle sections 44, 45 of the drive axle 2. The electric machine 16 can also be operated as a generator in the operating states of the drive system 1 described in FIGS. 2 to 4 and 6 to 8 to supercharge an energy store of a motor vehicle. In this context, for example kinetic energy of the motor vehicle is converted into electrical energy by means of the electric machine 16.

Figure 9:
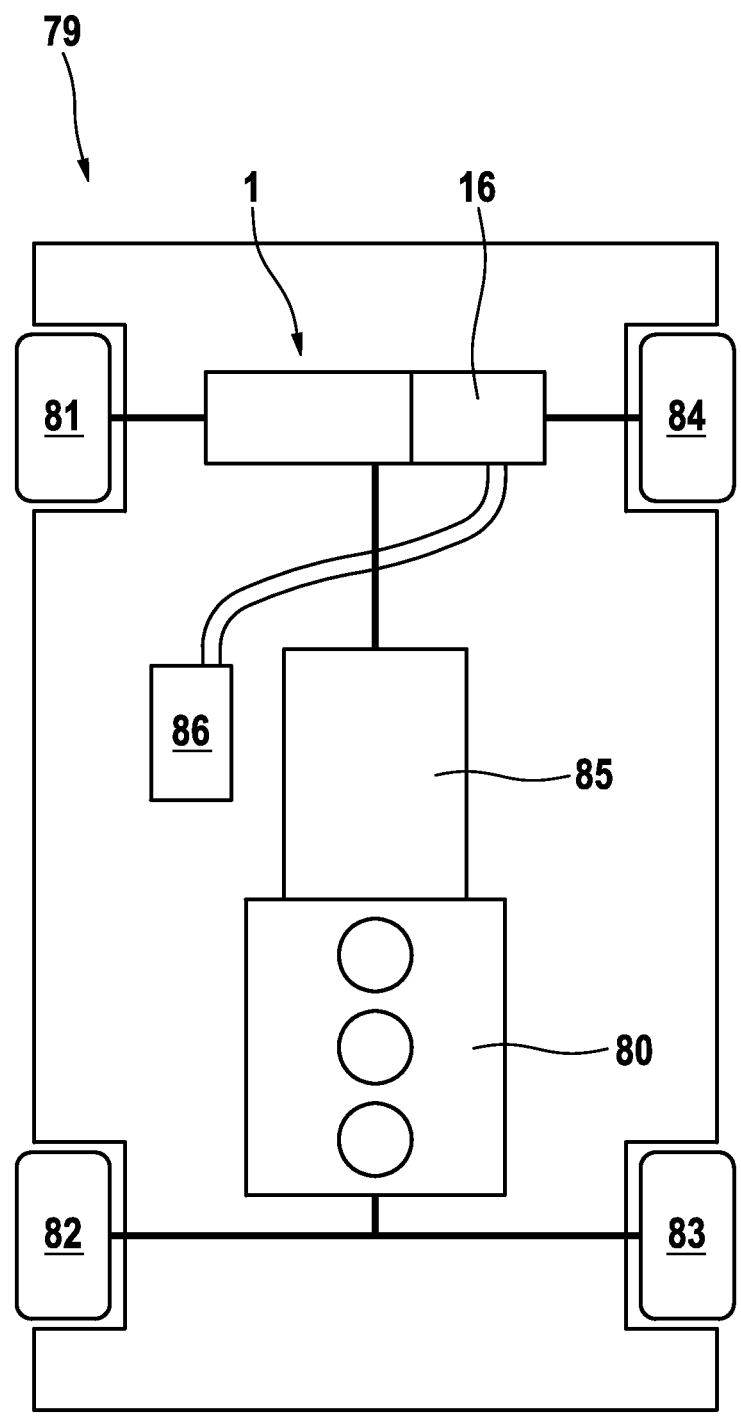
FIG. 9 is a plan view of a motor vehicle with a drive system of FIGS. 1 to 8.

FIG. 9 illustrates a preferred exemplary embodiment of a motor vehicle 79 with a drive system 1 according to FIGS. 1 to 8. The motor vehicle 79 has, for example, an internal combustion engine 80 and a drive system 1 which is embodied, for example, as an electric front axle 1. The internal combustion engine 80 and the drive system 1 serve to drive wheels 81 to 84 of the motor vehicle 79. The internal combustion engine 80 can be coupled, preferably in a shiftable fashion, to the drive system 1 in order to implement a mechanical four-wheel drive of the motor vehicle 79, for example by means of a suitable transmission 85. This coupling is optional. Alternatively, there is no mechanical coupling between the internal combustion engine 80 and the drive system 1. The motor vehicle 79 preferably has an energy store 86 for storing electrical energy which is generated by the electric machine 16 and for operating the latter in electric motor mode.

What is claimed is:

1. A drive system for a drive axle of a motor vehicle, comprising an electric machine that at least partially encloses the drive axle, a shifting device for coupling the electric machine to the drive axle for driving the drive axle and for decoupling the electric machine from the drive axle, the shifting device having a shifting sleeve that is substantially coaxial with the drive axle and at least partially enclosing the drive axle, the shifting sleeve being axially displaceable on the drive axle, the drive system further having first and second first gear stages for implementing first and second transmission ratios between the electric machine and the drive axle, the shifting sleeve having a first shifting sleeve outer toothing operatively engaged with a sun gear inner toothing of a sun gear of the second gear stage and a second shifting sleeve outer toothing spaced axially from the first shifting sleeve outer toothing, the second shifting sleeve outer toothing being operatively disengaged from a planetary carrier inner toothing of a planetary carrier of the first gear stage and from a sun gear inner toothing of a sun gear of the first gear stage in a first operating state of the drive system.

2. The drive system of claim 1, wherein the drive axle has two drive axle sections that are connected operatively to one another by a planetary or ball-type differential transmission.

3. The drive system of claim 2, wherein the second shifting sleeve outer toothing is operatively engaged with the planetary carrier inner toothing of the planetary carrier of the first gear stage in a second operating state of the drive system to transmit a driving torque of the electric machine to the drive axle via the first gear stage, the shifting sleeve, the second gear stage and the planetary differential transmission.

4. The drive system of claim 2, wherein the second shifting sleeve outer toothing is operatively engaged with the sun gear inner toothing of the sun gear of the first gear stage in a third operating state of the drive system to transmit a driving torque of the electric machine via the shifting sleeve, the second gear stage and the planetary transmission to the drive axle.

5. The drive system of claim 1, further comprising a liquid cooling device and/or as an air cooling device for cooling the electric machine.

6. The drive system of claim 1, wherein the drive system has a bevel transmission with a crown gear mounted on a planetary carrier of the second gear stage.

7. The drive system of claim 1, wherein the drive system has a modular design.

8. The drive system of claim 1, wherein the electric machine is designed for an electric motor operating mode and for a generator operating mode.

9. A motor vehicle having the drive system of claim 1.

* * * * *